July 20, 1926.

G. L. HAMMOND ET AL

1,592,933

RUBBER JAR RING CUTTING MACHINE

Filed March 15, 1923 4 Sheets-Sheet 1

INVENTORS
Guy L. Hammond and
William Nicholas
BY
Chamberlin & Newman ATTORNEYS.

Patented July 20, 1926.

1,592,933

UNITED STATES PATENT OFFICE.

GUY L. HAMMOND AND WILLIAM NICHOLAS, OF BRIDGEPORT, CONNECTICUT, ASSIGNORS TO THE BLACK ROCK MANUFACTURING COMPANY, OF BRIDGEPORT, CONNECTICUT, A CORPORATION OF CONNECTICUT.

RUBBER-JAR-RING-CUTTING MACHINE.

Application filed March 15, 1923. Serial No. 625,204.

The present invention relates to an improved machine for cutting rubber rings, being particularly adapted for use in the cutting of rubber rings, such as are used, for instance, in sealing fruit jar covers, although the invention is not so limited.

An object of the invention is to provide a machine of this character which is entirely automatic in operation, and by means of which the cutting of the rings may be carried out accurately and rapidly. As regards the automatic operation it is proposed to provide means whereby the carriage for the cutting knives will be automatically stopped when the end of the rubber tube is reached, and the knives prevented from further engaging the tube. It is also proposed to provide return feed means for the carriage to automatically return it to starting position when the end of the rubber tube is reached.

Another object of the invention is to enable the cutting knives to be adjusted to the particular thickness of the tube being cut, thereby enabling the machine to operate with the greatest efficiency, and as perfectly upon one thickness of tube as another. It is also an object to permit the speed of operation of the machine to be changed in correspondence to the thickness of tube being cut.

A still further object is to provide cutting knives of circular form, which may be sharpened with facility, and so arranged as to continually present a new cutting edge as the machine operates.

Other objects are to provide a machine which will be of comparatively simple construction, will not readily get out of order, and which will be extremely simple to operate.

With the above and other objects in view, the embodiment of the invention is shown in the accompanying drawings, and this embodiment will be hereinafter more fully described with reference thereto, and the invention will be pointed out in the claims.

In the drawings:—

Similar reference characters indicate corresponding parts throughout the several figures of the drawings.

Figures 1, 11:
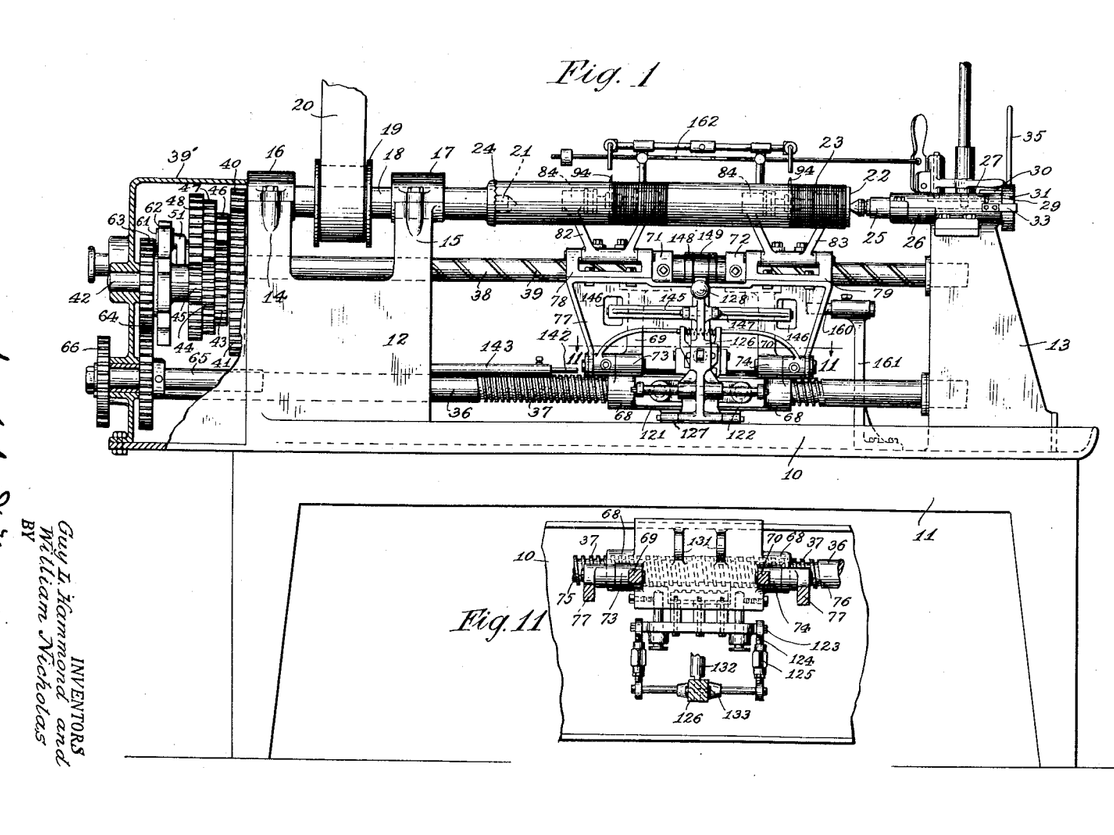
Fig. 1 is a front elevation of a ring cutting machine embodying our invention.
Fig. 11 shows a sectional plan view of feed screw and nut engaging mechanism taken on line 11—11 of Fig. 1.

Referring particularly to Fig. 1 of the drawings, the machine frame comprises a pan-shaped base 10, mounted on a suitable legged support 11, and provided at its ends with a head-stock 12 and a tail-stock 13. The head-stock is provided at its upper end with a pair of spaced supports 14 and 15, carrying bearings 16 and 17 for the mandrel shaft 18, a pulley 19 thereon being driven by means of a belt 20. The mandrel shaft is provided at its inner end with a pilot extension 21 and suitable means for driving mandrel 22, upon which the tube 23 to be cut is placed. A toothed face 24 is provided on the inner end of the mandrel shaft 18 which engages in the tube at the end of the mandrel, to prevent relative rotary movement between the tube and mandrel.

Figures 8, 9, 10:
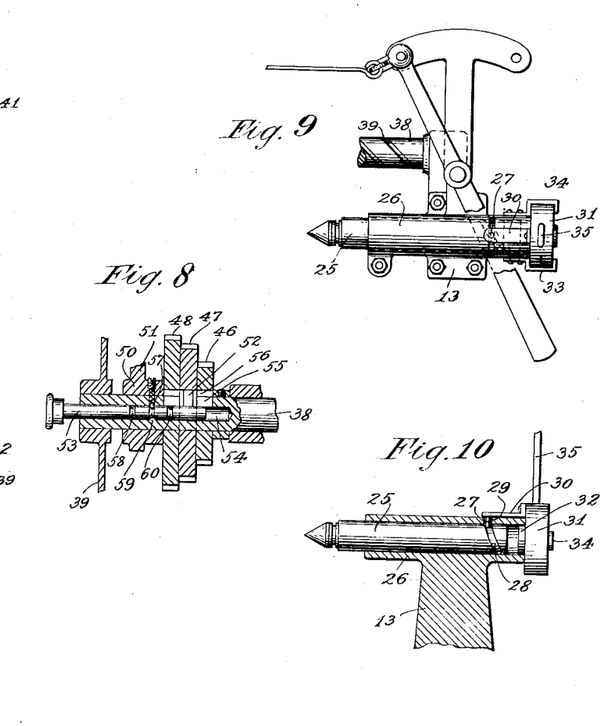
Fig. 8 is a vertical longitudinal sectional view taken along the line 8—8 of Fig. 6, and showing the key adjusting means for the selective gears.
Fig. 9 is a plan view of the tail stock of the machine.
Fig. 10 is a vertical sectional view thereof.

The other end of the mandrel is engaged and supported by an adjustable cone center 25, in the form of a cylindrical shaft slidable in the tubular bearing 26 at the upper end of the tail stock. The cone center is longitudinally movable to engage and disengage the mandrel by means of a pin 27 engaging a spiral slot 28 in its end through a slot 29 in the bearing portion 26, the pin being carried upon the end of an arm 30 provided on a disk 31, centered upon the end of the portion 26 by means of a boss 32 fitting in its bore, and held therein by clamping members 33 and 34. A handle 35 is provided for turning the disk and thereby moving the pin 27.

An intermittently rotated feed shaft 36 having a low pitch screw 37 formed therein, is journaled in the head and tail stocks, and is adapted to intermittently feed the carriage, while directly above it there is journaled a cam shaft 38, adapted to be continuously driven to feed the cutting knives into and out of cutting relation, and provided with a high pitch spiral screw 39, adapted as will hereinafter more fully appear, to automatically return the carriage to starting position.

Figure 6:
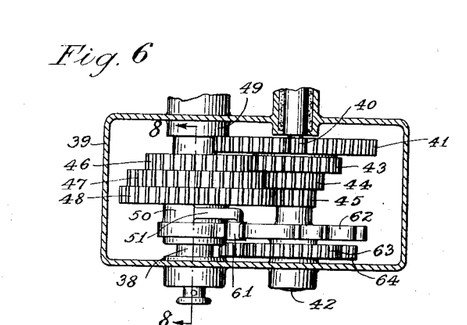
Fig. 6 is a sectional plan view of the selective gear mechanism and casing enclosing same.
Figure 7:
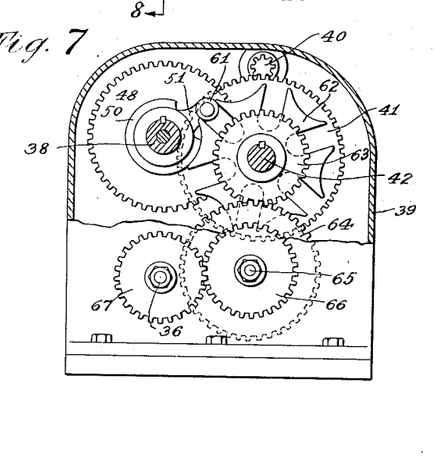
Fig. 7 is a sectional elevation thereof.

The shafts 36 and 38 are driven from the mandrel shaft 18 by means of selective gears provided within a casing 39, at the outer side of the head stock.

Upon the end of the mandrel shaft, and within the casing 1, there is provided a pinion 40, meshing with a large gear 41, loosely mounted on a counter-shaft 42 journaled within the casing, and also carrying gears 43, 44 and 45 of decreasing diameter and rotatable with the gear 41. These gears 43, 44 and 45 mesh with gears 46, 47 and 48 mounted on the shaft 38 between a collar 49 and the hub 50 of a crank lever 51 keyed to the shaft.

The gears 46, 47 and 48 are adapted to be singly connected to the shaft 38, by means of a key 52, provided on a slide-rod 53, fitted into a hole 54 bored into the end of the shaft, the key engaging a slot 55 of the shaft and adapted upon movement of the rod to be engaged with the key slots 56 of either of the gears. The rod is yieldably fixed in adjusted position by means of a spring-pressed ball 57, engaging annular spaced grooves 58, 59 and 60 formed in the rod. In this manner the speed of rotation of the shaft 38 may be varied, at will.

The crank lever 51 is provided at its end with a roller 61 and is adapted to cooperate with a Geneva sprocket 62, keyed to the shaft 42, and adapted to be intermittently rotated through a partial revolution, upon each revolution of the shaft 38. A gear 63 is keyed to the shaft 42, to be driven by the sprocket, and meshes with a gear 64, provided upon an intermediate shaft 65, which in turn drives the shaft 36 intermittently, through gears 66 and 67 provided upon the shafts 65 and 36, at the outer side of the casing.

Figure 2:
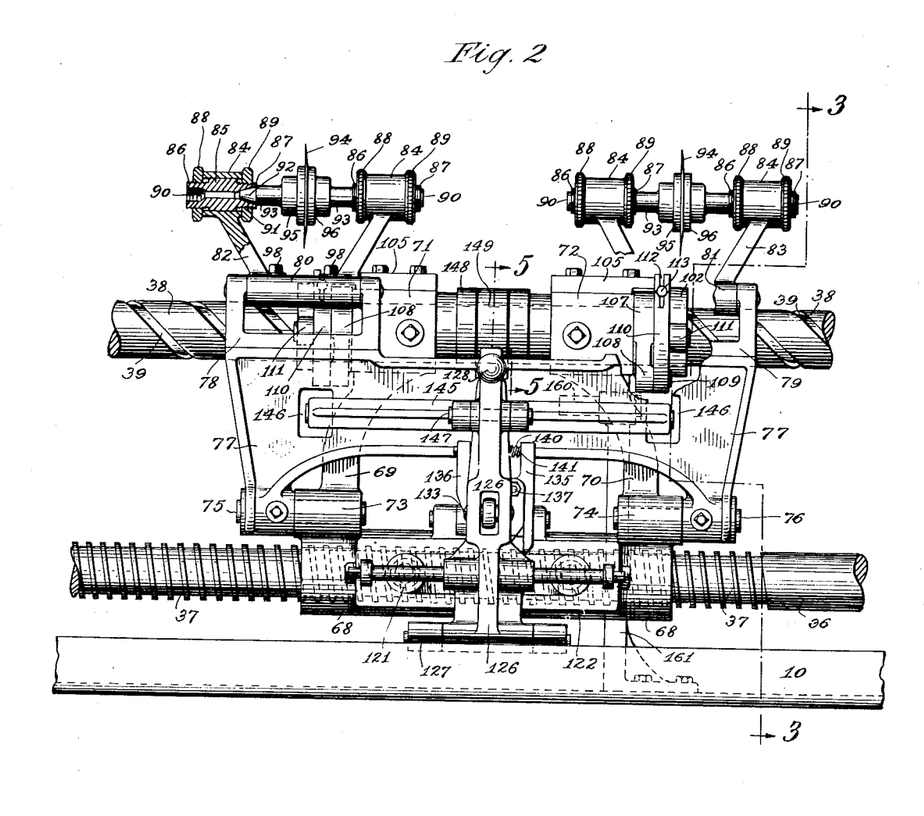
Fig. 2 is an enlarged detail front elevational view, partly in section, of the knife carrier, part being broken away for clearness.
Figures 3, 4, 5:
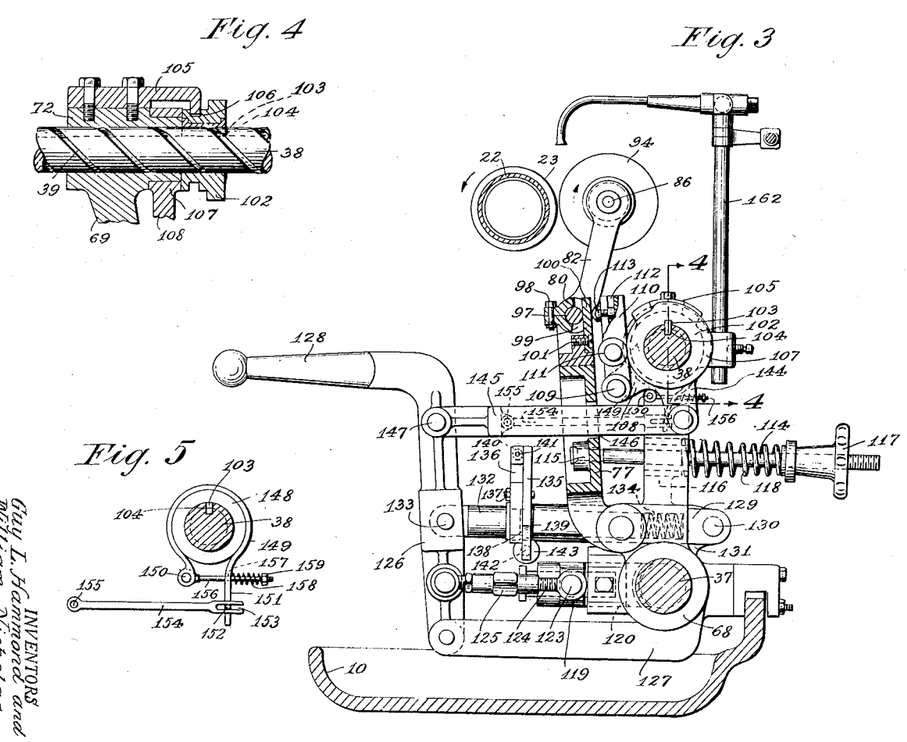
Fig. 3 is a vertical sectional view taken along the line 3—3 of Fig. 2.
Fig. 4 is a detail sectional view along the line 4—4 of Fig. 3, and showing the attachment means for the knife operating cam.
Fig. 5 is a detail sectional view along the line 5—5 of Fig. 2, and showing the carriage return nut and its associated operating parts.

The knife carriage consists of a horizontal tubular portion 68 engaging the screw shaft 37, and having upwardly extending integral supports 69 and 70 at its ends, provided at their upper ends with tubular bosses 71 and 72 engaging the cam shaft 38. At the bases of the supports 69 and 70 there are formed tubular bearing portions 73 and 74, which pivotally support the shaft ends 75 and 76 of a rocker-plate 77. This plate is suitably flanged for strength, and carries at its upper side a pair of brackets 78 and 79, in which the hub portions 80 and 81 of knife-supporting yokes 82 and 83 are pivotally mounted. The carrier, it will be understood supports and simultaneously operates a pair of spaced knife units. One or a plurality of such units may be provided as desired.

The ends of the yokes are provided with cylindrical portions 84 in which tubular bearing members 85 are fitted. These bearing members are provided with reduced threaded end portions 86 and 87 and are secured for longitudinal adjustment by means of nuts 88 and 89 upon said portions. In the outer end of the member 85 there is provided a removable oil retaining plug 90, and at its inner end it is recessed, as at 91, to receive the tapered end 92 of the knife shaft 93, and upon the center portion of which the circular knife 94 is held between collars 95 and 96. The construction is such that while the knives are not positively rotated, they will be turned through frictional contact with the rotating rubber tube.

The hub portion 80 of the yoke is split longitudinally and flanged, as at 97, (Fig. 3) and is secured upon the shaft of the bracket by bolts 98, so that while the yoke is normally fixed with relation to the rocker-plate, it is capable of adjustment to change the position of the knife. The yoke is furthermore provided with a cut-out portion 99, into which extends a bearing plate 100 secured to the bracket by means of a screw 101.

The bosses 71 and 72 each carry a cam 102, rotatable with the cam shaft 38 by means of a key 103 (Fig. 4) engaging a longitudinal slot 104 of the shaft, and rotatably secured to the boss by a flange-plate 105 engaging an annular groove 106 in the hub of the cam.

The boss is provided with a reduced bearing portion, upon which a collar 107 is mounted, and which has formed thereon an arm 108, pivotally supporting at 109 a lever 110 carrying a roll 111 intermediate its ends, and which is engaged by the cam 102. The upper end of the lever is provided with a T-slot 112, in which a button 113 is adjustably secured, and which bears upon the plate 100. It will be seen that by adjusting the position of the button, the effective throw of the lever 110 may be varied, and thereby the cutting movement of the knives, without changing the cams. The cams have a gradual rise and a quick fall, so that the knives are moved in with a relatively slow movement, and are moved out relatively quickly.

The rocker plate is normally held in its rearward or knife-engaging position, and also the levers 110 are held in engagement with their actuating cams by means of a rod 114, swivelly connected to the plate at 115, and extending through a boss 116 fixed upon the upper side of the tubular portion 68 of the carrier, the bar being threaded at its end, and carrying an adjustable hand-nut 117, between which and the boss there is provided a coil spring 118, the tension of which may be adjusted by means of the hand-nut.

The carriage is adapted to be intermittently fed after each cutting operation, by means of a nut 119 engaged with the screw 37 through a pocket 120 in the portion 68, the nut being adapted to be automatically disengaged at the end of the forward feed, as will be presently more fully pointed out. A pair of guide pins 121 and 122 are provided on the housing 68 to support and guide the nut operating means connected to be operated through a yoke 19' whose ends 123 are pivotally connected by a rod 124, having an adjustable turn buckle 125 therein, to a lever 126 pivoted at its lower end to a forwardly extending arm 127, formed upon the carriage, and provided at its upper end with an outwardly bent handle portion 128. The nut is manually engaged with the screw by inward movement of the lever, and automatically disengaged by outward movement, being retained in the first position by means of a releasable latch device.

The latch device consists of a tubular member 129 pivotally connected at 130 to a bracket portion 131 of the frame, and a rod 132, telescopically engaging the member 129 and pivotally connected at 133 to the lever. A helical spring 134 within the tubular member tends to force the rod 132 outwardly to disengage the nut, the rod being normally retained in its inner position, however, by means of a latch lever 135 pivotally mounted upon a bracket 136 at 137, and engaging a notch 138 in the rod 132 through a slot 139 in the tubular member. A spring 140 mounted upon a slide rod 141 normally retains the latch lever in latching position, and causes it to engage the notch 138 when the lever 136 is manually swung inwardly to engage the nut with the feed screw.

The lower end of the latch lever projects below the tubular member 129 into the path of a trip bar 142 (Fig. 1), mounted for longitudinal adjustment in a tubular post 143, so that as the carriage reaches a point in its travel, where further movement would cause the knives to engage the mandrel shaft the latch lever is tripped, thereby releasing the bar 132, which moves the lever 126 outwardly, and disengages the nut 119 from the feed screw 37. This prevents any possible injury to the knives.

It is also desirable upon stopping the longitudinal feed of the carriage to stop further engagement of the knives with the rubber tube. To this end the collars 107 of the bosses 71 and 72 are respectively provided with arms 144 (Fig. 3) pivotally connected to the ends of a yoke-shaped arm 145, extending through openings 146 in the plate 77, and pivotally connected at 147 to the lever 126. Upon outward movement of the lever 126 the collar is thus rotated, lifting the lever 110 so that the button 113 is moved up and provided a greater fulcrum to operate on the bearing plate 100. The cam 102, while continuing to rotate will be ineffective to move the knives to cutting position.

In order to effect the return movement of the carriage, so that the machine will be ready for the next cutting operation, the cam shaft 38, as before pointed out, is provided with a high pitch spiral groove 39, and mounted between the bosses 71 and 72 of the carriage is a nut 148, normally rotating free of the carriage during the intermittent feed of the latter by means of the screw 37. A band brake 149 surrounds the nut 148 and has one end pivotally connected at 150 to the carriage frame, while its other end is extended downwardly, as at 151, where it is provided with a pin 152, engaged in the slotted end 153 of a bar 154 pivotally connected at 155 to the yoke member 145. A post 156 upon the frame extends through a hole 157 in the portion 151 of the brake, a spring 158 held upon the post by a nut 159 adapted to press the band into holding engagement with the nut. During the normal operation of the machine, however, the engagement of the end of the slot 153 with the pin 152 releases the brake from holding engagement. The brake is engaged upon outward movement of the lever 126, which movement as above pointed out also simultaneously disengages the nut 119, and upon such engagement of the brake the nut 148 is tightly held against rotation, and the screw 39 is thus rendered effectual to feed the carriage to its starting position. Upon reaching such position a wedge-shaped cam 160 adjustably mounted in a support 161 engages behind the portion 151 of the brake thereby releasing it from the nut, the carriage then remaining stationary. The cut rings are now removed from the mandrel and a new tube to be cut is placed thereon, whereupon the machine is again set in operation by moving the lever 126 inwardly.

Cooling water supplying means is indicated at 162, this however, forming no part of the present invention.

It will be noted that in operation the provision of the two spaced cutting knives enables the tube to be cut into rings in onehalf the time that would be required with a single knife. One of the knives starts to cut at the end of the tube, while the other simultaneously starts to cut at the center of the tube, Fig. 1 showing clearly the manner in which the rings are cut by the two knives after the machine has been in operation for a short period.

We have illustrated and described a preferred and satisfactory embodiment of the invention, but it is obvious that changes may be made therein within the spirit and scope thereof, as defined in the appended claims.

We claim:—

1. A machine of the character described, comprising a tube supporting mandrel, a knife, a carrier to feed the knife along the mandrel and adapted to impart inward and outward movement to said knife and selective gear means for varying the periodicity of such movement without varying said feed.

2. A machine of the character described, comprising a tube supporting mandrel, a knife, a carrier to feed said knife along the mandrel, a cam shaft and cam means adapted to impart inward and outward movement to said knife, and selective means for varying the speed of rotation of said cam shaft without varying said feed.

3. A machine of the character described, comprising a tube supporting mandrel, a knife, a carrier to feed the knife along the mandrel, a cam shaft and cam means adapted to impart inward and outward movement to said knife, and selective gear means adapted to vary the speed of rotation of said cam shaft without changing said feed.

4. A machine of the character described, comprising a tube supporting mandrel, driving means therefor, a knife, a carrier to feed said knife along the mandrel, a cam shaft, and cam means adapted to impart inward and outward movement to said knife, a plurality of pairs of selective gears connecting said driving means and said cam shaft, and manually controlled means for operatively connecting one or the other of said pairs of gears to vary the speed of rotation of said cam shaft the rate of feed of the knife remaining constant.

5. A machine of the character described, comprising a tube supporting mandrel, a knife, a carrier for said knife, a screw feed shaft for said carrier, means for imparting intermittent rotary movement to said shaft, a nut carried by said carrier and adapted to be engaged and disengaged with said screw to feed and stop said carrier, a latch device adapted to retain said nut in engagement with said screw, and trip means adapted to release said nut at a predetermined point in the feed of the carrier.

6. A machine of the character described, comprising a tube supporting mandrel, a knife, a carrier for said knife, a screw feed shaft for said carrier, means for imparting intermittent rotary movement to said shaft, a nut carried by said carrier and adapted to be engaged and disengaged with said screw to feed and stop said carrier, a latch device comprising a pair of extensible members, spring means adapted to extend said members to disengage the nut, and a latch lever adapted to retain said members in retracted nut engaging position, and trip means adapted to engage said latch lever at a predetermined point in the feed of said carrier to release said latch device.

7. A machine of the character described, comprising a tube supporting mandrel, a knife, a carrier for said knife, means adapted to impart inward and outward movement to said knife to engage and disengage it with the tube, a screw shaft for said carrier, means for imparting intermittent movement to said shaft, a nut carried by said carrier adapted to be engaged and disengaged with said screw to feed and stop said carrier, and means for preventing engagement of said knife with said tube simultaneously with the stopping of the feed of said carrier.

8. A machine of the character described, comprising a tube supporting mandrel, a knife, a carrier for said knife, a cam shaft, and cam means on said shaft, a cam lever engaging said means and adapted to impart movement to said carrier to engage and disengage said knife with the tube, a screw shaft for said carrier, means for imparting intermittent movement to said shaft, a nut carried by said carrier adapted to be engaged and disengaged with said screw to feed and stop said carrier, and means for establishing an inoperative relation between said cam lever and said carrier simultaneously with the stopping of the feed of said carrier.

9. A machine of the character described, comprising a tube supporting mandrel, a knife, a carrier for said knife, a cam shaft, and cam means on said shaft, a cam lever engaging said means and adapted to impart movement to said carrier to engage and disengage said knife with the tube, a rotary mounting on said cam shaft for said cam lever, a screw shaft for said carrier, means for imparting intermittent movement to said shaft, a nut carried by said carrier adapted to be engaged and disengaged with said screw to feed and stop said carrier and means adapted to rotate said mounting to move said cam lever into inoperative relation simultaneously with the stopping of the feed of said carrier.

10. A machine of the character described, comprising a tube supporting mandrel, a knife, a carrier for said knife, a cam shaft, and cam means on said shaft, a cam lever engaging said means and adapted to impart movement to said carrier to engage and disengage said knife with said tube, a rotary mounting on said cam shaft for said cam lever, a screw shaft for said carrier, a nut carried by said carrier, a lever adapted to engage said nut with said screw shaft to feed the carrier, means for automatically moving said lever to disengage said nut at a predetermined point in the feed of said carrier, and connecting means between said lever and said rotary mounting whereby said cam lever is moved to inoperative relation upon stopping of the feed of said carrier.

11. A machine of the character described, comprising a tube supporting mandrel, a knife, a carrier for said knife, a cam shaft, cam means carried thereby adapted to impart inward and outward movement to said knife to engage and disengage it with the tube, means adapted to feed said carrier, said cam shaft being provided with a return feed screw, and means carried by said carrier adapted to be operatively related to said return feed screw at a predetermined point in the forward feed of said carrier to return the carrier to starting position.

12. A machine of the character described, comprising a tube supporting mandrel, a knife, a carrier for said knife, a cam shaft, cam means carried thereby adapted to impart inward and outward movement to said knife to engage and disengage it with the tube, means adapted to feed said carrier, said cam shaft being provided with a return feed screw, a nut engaging said screw and normally freely rotatable relatively to said carrier, and means operable at a predetermined point in the forward feed of said carrier adapted to hold said nut against rotation to effect return of said carrier.

13. A machine of the character described, comprising a tube supporting mandrel, a knife, a carrier for said knife, a cam shaft having a longitudinal key slot and a return feed screw, cam means carried by said carrier and slidably keyed to said cam shaft, and adapted to impart movement to said knife to engage and disengage it with the tube, means adapted to feed said carrier and means carried by said carrier adapted to be operatively related to said return feed screw at a predetermined point in the forward feed of said carrier to return the carrier to starting position.

14. A machine of the character described, comprising a tube supporting mandrel, a knife, a carrier for said knife, a cam shaft, cam means carried thereby adapted to impart movement to said knife to engage and disengage it with the tube, means adapted to feed said carrier, said cam shaft being provided with a return feed screw, a nut engaging said screw and normally freely rotatable relatively to said carrier, and a band brake surrounding said nut and adapted to be operated at a predetermined point in the forward feed of said carrier to hold said nut against rotation to effect the return of said carrier to starting position.

15. A machine of the character described, comprising a tube supporting mandrel, a knife, a carrier for said knife, a cam shaft, cam means carried thereby adapted to impart movement to said knife to engage and disengage it with said tube, means adapted to feed said carrier, said cam shaft being provided with a return feed screw, a feed screw for said carrier, a nut carried by said carrier adapted to be engaged and disengaged with said feed screw to feed and stop said carrier, means carried by said carrier adapted to be operatively related to said return feed screw to effect the return of said carrier, and means adapted to simultaneously disengage said nut from said feed screw and operatively relate said last named means to said return feed screw.

16. A machine of the character described, comprising a tube supporting mandrel, continuous drive means for said mandrel, a cutting knife, a carrier for said knife, a low pitch screw shaft, intermittent gear means driven from said continuously driven means adapted to intermittently rotate said screw shaft to intermittently feed said carrier forward with a relatively slow movement, and a high pitch screw shaft driven from said continuously driven means adapted to impart a relatively fast return feed movement to said carrier at the end of its forward feed.

17. A machine for cutting gaskets comprising a tube supporting mandrel, a knife, a carrier for the knife, a cam shaft and cam means on the shaft, a cam lever engaging said means and adapted to impart movement to said carrier to engage and disengage the knife with the tube, a screw shaft for the carrier, means for imparting intermittent movement to the shaft, means carried by the carrier and adapted to be engaged and disengaged with the screw to feed and stop the carrier, and means for establishing an inoperative relation between the cam lever and carrier simultaneously with the stopping of the feed of the carrier.

18. A machine of the character described, comprising a tube supporting mandrel, a knife, a carrier for the knife, a cam shaft, cam means on the shaft, a cam lever engaging said means and adapted to impart movement to the carrier to engage and disengage the knife with the tube, a rotary mounting on the cam shaft for said cam lever, a screw shaft for the carrier, means for imparting intermittent movement to the shaft, an element carried by the carrier and adapted to be engaged and disengaged with the screw to feed and stop the carrier, and means adapted to rotate said mounting to move the cam lever into operative relation simultaneuosly with the stopping of the feed of the carrier.

19. A machine of the character described comprising a tube supporting mandrel, a knife, a carrier for the knife, a cam shaft, cam means carried thereby adapted to impart movement to the knife to engage and disengage it with the tube, means adapted to feed the carrier, the cam shaft being provided with a return feed screw, an element engaging said screw and normally freely rotatable relative to the carrier, and means operable at a predetermined time to hold the element against rotation to effect the return of the carrier to a starting position.

20. A machine of the character described comprising a tube supporting mandrel, a knife, a carrier for the knife, a shaft, means carried thereby adapted to impart inward and outward movement to the knife to engage and disengage it with the tube, means adapted to feed the carrier, a return screw on the shaft, and means carried by the carrier adapted to be operatively related to the feed screw at a predetermined point in the forward feed of the carrier to return the latter to starting position.

21. A machine of the character described comprising a tube supportng mandrel, a rocker plate arranged adjacent the mandrel, cutting means carried by the rocker plate, pivoted elements supported adjacent the rocker plate and contacting with the latter, rollers carried by the pivoted elements, and cams arranged to engage the rollers and thereby move the pivoted elements in a direction to actuate the rocker plate, and means for returning the rocker plate to its normal position.

22. A machine of the character described comprising a tube supporting mandrel, a rocker plate arranged adjacent the mandrel, cutting means carried by the rocker plate, pivoted elements supported adjacent the rocker plate and contacting with the latter, rollers carried by the pivoted elements, cams arranged to engage the rollers and thereby move the pivoted elements in a direction to actuate the rocker plate, and means for returning the rocker plate to its normal position, such means including a rod connected with the rocker plate, and a spring engaging in abutment on the rod, and a second abutment arranged in advance of the first mentioned abutment.

23. A machine of the character described comprising a tube supporting mandrel, a rocker plate arranged adjacent the mandrel, cutting means carried by the rocker plate, pivoted elements supported adjacent the rocker plate and contacting with the latter, rollers carried by the pivoted elements, a cam shaft, collars arranged thereon, cams on the shaft, an arm carried by each collar and having pivotal connection with the pivoted elements, and cuttng means carried by the rocker plate.

24. A machine of the character described comprising a tube supporting mandrel, a rocker plate arranged adjacent the mandrel, cutting means carried by the rocker plate, pivoted elements supported adjacent the rocker plate and contacting with the latter, rollers carried by the pivoted elements, a cam shaft, collars arranged thereon, cams on the shaft, an arm carried by each collar and having pivotal connection with the pivoted elements, cutting means carried by the rocker plate, the pivoted elements being provided with slots, and studs adjustable in the slots and contacting with the rocker plate.

25. A gasket cutting machine comprising a base, a carriage longitudinally movable on the base, means for imparting such movement to the carriage, cutting means on the carriage, a mandrel supported adjacent the cutting means, means for intermittently moving the cutting means towards the mandrel, such means including coacting threaded elements, one of which being movable away from the other but normally engaged therewith, a spring-pressed plunger supported by the carriage, a lever also pivotally supported on the carriage and having operative connection with the spring-pressed plunger, and means engaging the spring-pressed plunger for normally holding the same in a position where the movable threaded element will be engaged with the other threaded element, and such means being rendered inoperative to cause the movable threaded element to move away from the other threaded element upon the completion of movement of the carriage in one direction.

26. A machine for cutting annuli comprising a base, cutting means pivotally associated therewith, a work supporting mandrel arranged adjacent the cutting means, a rotatable feed screw, a carriage slidable on the feed screw including a threaded element normally engaged with the feed screw and capable of movement away from the same whereby to stop the movement of the carriage, latch means normally engaged with the threaded element to hold the same in operative position and a trip element arranged adjacent one end of the feed screw adapted to disengage the latch means from the threaded element to permit the nut to move away from the feed screw.

27. A machine for cutting annuli comprising a base, cutting means pivotally associated therewith, a work supporting mandrel arranged adjacent the cutting means, a rotatable feed screw, a carriage slidable on the feed screw including a threaded element normally engaged with the feed screw and capable of movement away from the same whereby to stop the movement of the carriage, latch means normally engaged with the threaded element to hold the same in operative position, a trip element arranged adjacent one end of the feed screw adapted to disengage the latch means from the threaded element to permit the nut to move away from the feed screw, and means operated simultaneously with the actuation of the latch means to prevent pivotal movement of the cutting means.

28. A machine for cutting gaskets comprising a base, a feed screw journaled thereon, a drive mechanism for the feed screw, a work supporting mandrel, a carriage longitudinally movable on the feed screw, a laterally movable threaded nut normally engaged with the feed screw, an arm extending from the carriage, a lever having one end pivotally connected with the arm, an operative connection between the nut and lever, a spring-pressed plunger having one end associated with the lever, means normally holding the spring-pressed plunger against movement so that the nut will engage the feed screw, and adapted to be disengaged from the plunger upon the completion of the movement of the carriage in one direction whereby to disengage the nut from the feed screw.

29. A machine for cutting gaskets comprising a base, a feed screw journaled thereon, a drive mechanism for the feed screw, a work supporting mandrel, a carriage longitudinally movable on the feed screw, a laterally movable threaded nut normally engaged with the feed screw, an arm extending from the carriage, a lever having one end pivotally connected with the arm, an operative connection between the nut and lever, a spring-pressed plunger having one end associated with the lever, means normally holding the spring-pressed plunger against movement so that the nut will engage the feed screw, and adapted to be disengaged from the plunger upon the completion of the movement of the carriage in one direction whereby to disengage the nut from the feed screw, and means for intermittently moving the cutting means towards the mandrel, and such means being rendered inoperative upon disengagement of the nut from the feed screw.

Signed at Bridgeport in the county of Fairfield and State of Connecticut this 14th day of March, A. D., 1923.

GUY L. HAMMOND.
WILLIAM NICHOLAS.